Dec. 14, 1954
R. S. HUNTER
2,696,750
AUTOMATIC PHOTOELECTRIC COLORIMETER
Filed Jan. 18, 1951
3 Sheets-Sheet 1
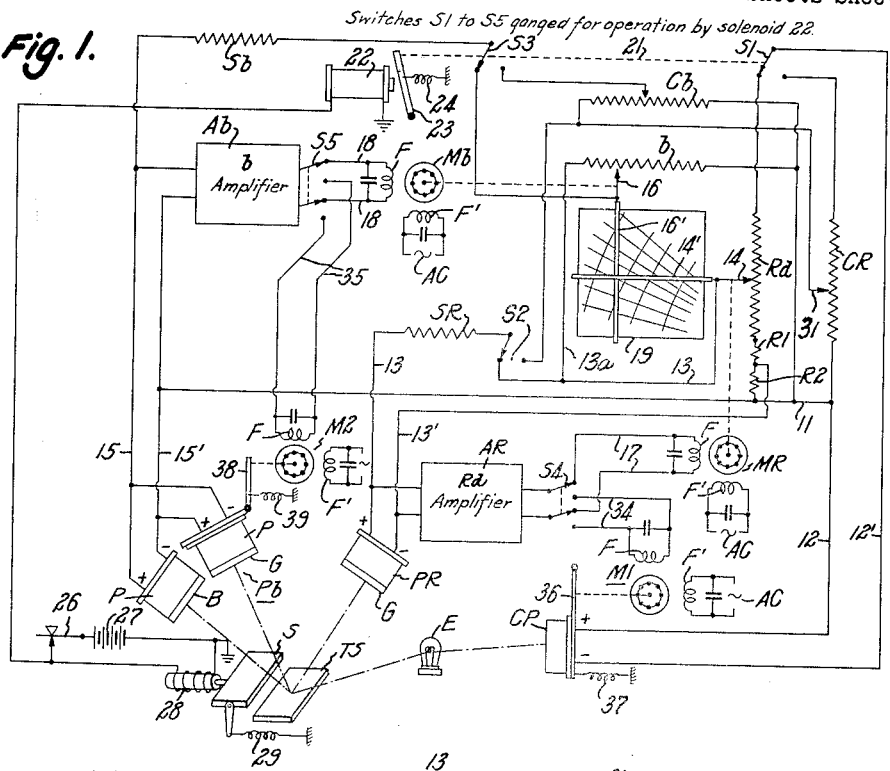
INVENTOR:
Richard S. Hunter,
BY Pierce, Scheffler & Parker,
ATTORNEYS Dec. 14, 1954  R. S. HUNTER  2,696,750
AUTOMATIC PHOTOELECTRIC COLORIMETER
Filed Jan. 18, 1951  3 Sheets-Sheet 2

INVENTOR:
Richard S. Hunter,
BY Pierce, Scheffler & Parker,
ATTORNEYS.

Dec. 14, 1954    R. S. HUNTER    2,696,750
AUTOMATIC PHOTOELECTRIC COLORIMETER
Filed Jan. 18, 1951    3 Sheets-Sheet 3
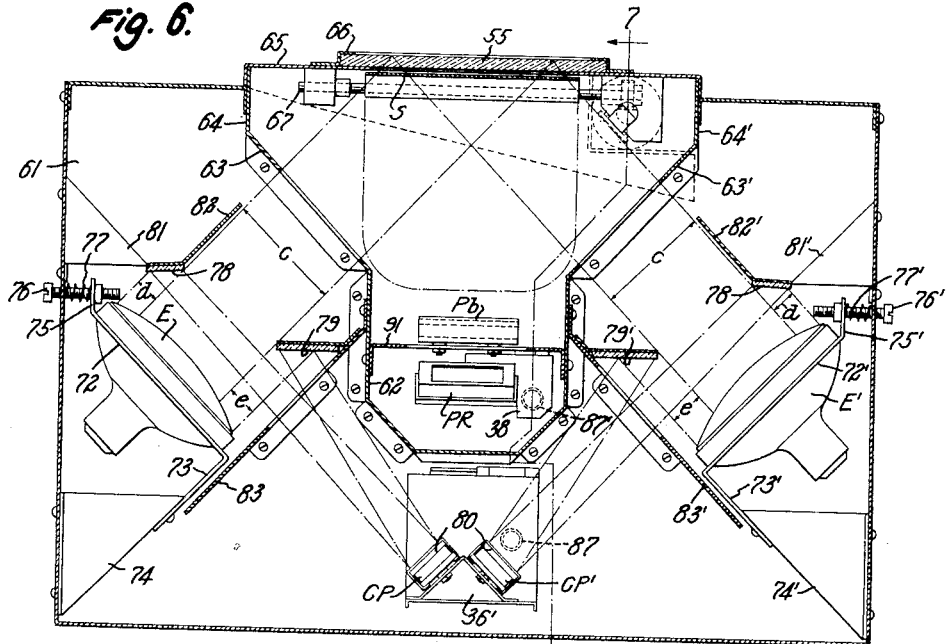
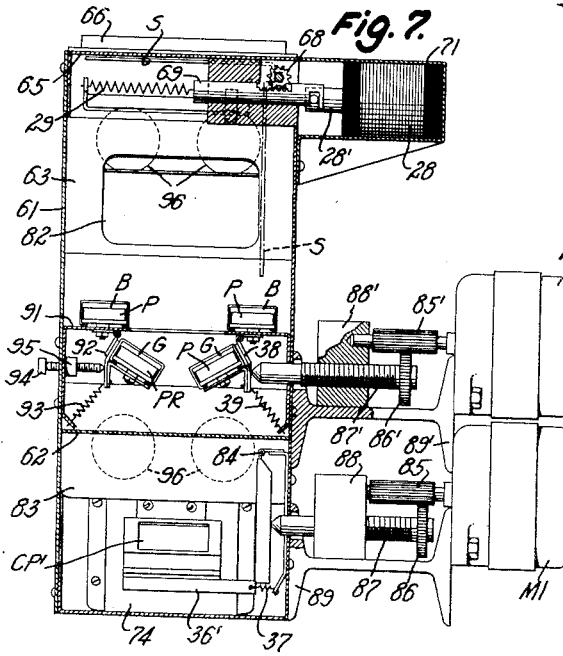
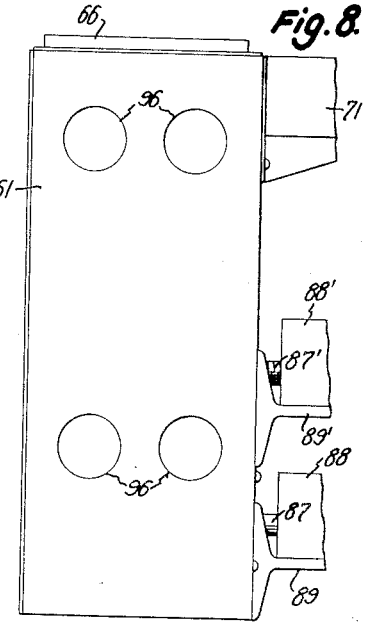
INVENTOR:
Richard S. Hunter,
BY Pierce, Scheffler & Parker,
ATTORNEYS.

United States Patent Office 2,696,750
Patented Dec. 14, 1954

2,696,750
AUTOMATIC PHOTOELECTRIC COLORIMETER

Richard S. Hunter, Franklin Park, Va., assignor to Henry A. Gardner Laboratory, Inc., Bethesda, Md., a corporation of the District of Columbia Application January 18, 1951, Serial No. 206,685

7 Claims. (Cl. 88—14)

This invention relates to automatic photoelectric colorimeters and more particularly to colorimeters for the automatic measurement of numerical values for the identification of a color on scales of approximately uniform color-preception spacing.

In my copending application Serial No. 79.603, filed March 4, 1949, now Patent No. 2,574,264, granted November 6, 1951, I have described and claimed a photoelectric tristimulus colorimeter for the direct measurement of the three factors ($R_d$=luminous reflectance; $\pm a$=red-green and $\pm b$=yellow-blue) in numerical values which constitute coordinates identifying the color by its psychological properties, i. e. by the impression received by an observer who views the color specimen. The prior apparatus included photocell-filter combinations for developing currents which varied in magnitudes with the values of the several tristimulus factors, and manually adjustable potentiometers for measuring the currents by balancing them against the much higher current output of a comparison photocell, the potentiometer dials being graduated in numerical values of the several factors.

Objects of the present invention are to provide photoelectric colorimeters which include automatically balancing potentiometers for the measurement of one or more of the factors which identify a color on a tristimulus colorimetry system. Objects are to provide an automatic colorimeter including a color diagram bearing significant numerical values, symbols or legends, and pointers movable with respect to the color diagram by the mechanisms for measuring two of the color factors, whereby the intersection of the pointers indicates the values of those factors in the color diagram. Objects are to provide automatic colorimeters of high sensitivity and accuracy which are continuously self-standardizing during periods between measuring operations to compensate for variations in the characteristics of the photocells and for other extraneous factors. More specifically, an object is to provide an automatic cotton colorimeter for measuring the light-dark and the chroma values of cotton specimens in terms of luminous reflectance $R_d$ and yellow $+b$.

These and other objects and the advantages of the invention will be apparent from the following specification when taken with the accompanying drawings, in which:

Fig. 1 is a screamatic view of the optical and electrical elements of an automatic cotton colorimeter embodying the invention;

Fig. 2 is a fragmentary schematic view showing only those elements of the complete colorimeter which are operative during color measurement;

Fig. 3 is a fragmentary schematic view showing only those elements which are operative during intervals between color measurements to standardize or retain the initial calibration of the colorimeter;

Fig. 6 is a front view of the exposure head of the colorimeter, with some of the parts shown on substantially vertical central section;

Fig. 7 is a transverse vertical section through the same substantially on line 7—7 of Fig. 6; and Fig. 8 is an end view of the exposure head.

Figure 4:
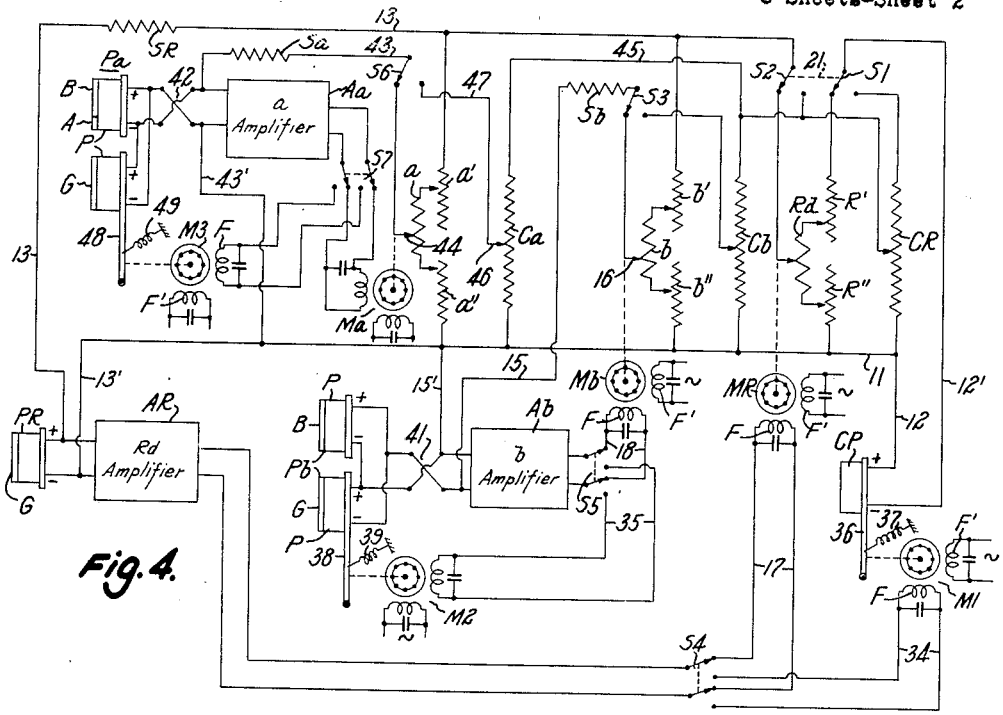
Fig. 4 is a circuit diagram of an automatic and self-standardizing colorimeter for measurement of the three values which identify a color on a tristimulus basis, the network being manually adjustable to select the effective measuring portion of each scale range.

In Fig. 1 of the drawings, the reference character E identifies a light source for illuminating a test specimen TS from which light is reflectel to a current generating photocell PR which is covered by a green filter G, and to a photocell combination P$b$ comprising a pair of photocells P which are covered, respectively, by a blue filter B and a green filter G. The photocells P are connected in series opposition, and the relative areas of the photocells and the transmission characteristics of the filters are such that a net positive current output from the combination is proportional to the yellow color component of the specimen on the same scale that the current output of the photocell PR is a measure of the luminous reflectance $R_d$ of the specimen. The light source also directly illuminates a comparison photocell CP to develop a constant current of an order substantially higher than the current outputs of the photocells which are illuminated by reflectance from the test specimen TS. It is to be understood that the specimen might be such that it transmitted light therethrough to the photocells but, for convenience of description and for the specific case of a cotton colorimeter, the invention will be described on the assumption that light is reflected from the test specimen to the measuring photocells.

Reference is made to Patent No. 2,574,264 for a detailed explanation of the photoelectric method of measuring the three factors which serve to identify a color on a tristimulus colorimetry system of uniform perceptibility units. In the grading of materials or specimens which have only a limited range of color variation, it is sufficient to measure only two factors as, for example, luminous reflectance and yellow value in the case of raw cotton. Other materials which vary in color over a limited range may of course be similarly measured in terms of only two of the tristimulus factors which afford a positive identification of any color.

The colorimeter includes two electrical networks for balancing the current outputs of the measuring photocell combinations PR and P$b$ against fractions of the substantially higher current output of the comparison photocell CP; the net works being energized alternatively by ganged switches for measurement of the color of a specimen TS or for restandardization when a standard specimen S of known color is moved into position to intercept the light rays directed towards the test specimen and to reflect them to the measuring photocell units.

Considering first the measuring network which is established when the switches are positioned as shown in Fig. 1, and which is separately shown in Fig. 2, the positive terminal of the comparison photocell CP is connected to a conductor 11 which constitutes the base or voltage reference point of the networks by a jumper 12, and the negative photocell terminal is connected by a lead 12′ and a switch S1 to one terminal of the slidewire $R_d$ of an automatic potentiometer, the other slidewire terminal being returned to the conductor 11 through the series resistances R1 and R2. The positive terminal of the photocell PR is connected by lead 13 and switch S2 to the tap 14 of the potentiometer slidewire $R_d$, and the negative terminal is connected by a lead 13′ to the junction of the resistances R1 and R2. An electronic amplifier AR is shunted across the photocell PR, and a resistance SR is included in lead 13 between the amplifier connection and the switch S2.

The slidewire $b$ of a second automatic potentiometer is connected between the lead 13, by a jumper 13$a$ to a point between the tap 14 and the switch S2, and the conductor 11, whereby the current established through this slidewire by the comparison photocell CP varies with the luminous reflectance of a specimen. The positive terminal of photocell combination P$b$ is connected through lead 15, series resistance S$b$ and switch S3 to the sliding contact 16 of the slidewire $b$, the negative terminal of the photocell combination is connected to conductor 11 by a lead 15′, and an electronic amplifier A$b$ is shunted across the photocell combination in advance of the series resistance S$b$.

The measurements of the luminous reflectance $R_d$ are made in known manner by moving the contact 14 along the slidewire $R_d$ to divert a small fraction of the comparison photocell current from its path through slidewire $R_d$ and resistors R1, R2, to oppose the current from photocell PR, thereby establishing a voltage balance at the input terminals of the amplifier AR and establishing a comparison current through the slidewire $b$ of a value which is dependent upon the luminous reflectance. At the same time, the contact 16 of that slidewire is adjusted to establish a potential balance at the input terminals of the amplifier $Ab$. The amplifiers are of electronic multitube type and energized from the usual light and power lines, not shown, and the amplifiers AR and $Ab$ control the operation of the reversing induction motors MR and $Mb$ respectively which adjust the sliding contacts 14 and 16 respectively. The output terminals of amplifier AR are connected through switch S4 and leads 17 to a field winding F of the motor MR, and the other field winding F' is continuously energized from the source AC. Similarly, the amplifier $Ab$ is connected through a switch S5 and leads 18 to a winding F of motor $Mb$ which has a second winding F'.

Pointers 14' and 16' are secured to or otherwise movable with the sliding contacts 14, 16 respectively, and are displaced at right angles to each other over a color diagram 19 which is preferably translucent and illuminated from the rear by a lamp, not shown. The color diagram may be provided with graduations and scales of any desired character and, in the case of a cotton colorimeter, is divided by sets of intersecting lines into zones corresponding to the several classes established by the 1946 International Grade Standards Conference. It is to be noted that, to bring the measuring characteristics of the colorimeter into conformity with the established visual gradations of the surface color of raw cotton or other materials, the measuring network must include one or more scale-adjusting elements. For example, the resistors R1 and R2 are connected between the slidewire $R_d$ of the luminous reflectance measuring circuit and the base conductor 11 to determine the effective measuring range of the luminous reflectance values $R_d$. The measuring range may be increased by decreasing the in-series resistance below the slidewire $R_d$ and, conversely the measuring range may be decreased by increasing the in-series resistance. Uniformity in measurement of chroma $b$ at different reflectance values is effected by selecting an appropriate ratio of the total resistance across the comparison photocell (slidewire $R_d$ plus resistances R1 and R2) to the resistance of the slidewire $b$. A decrease in the total resistance across the comparison photocell results in a more rapid variation of the comparison photocell current through the slidewire $b$ for equal adjustments of the contact 14 on the slidewire $R_d$, and thus results in an increased sensitivity or expanded scale displacement of the chroma $b$ pointer 16' at low values of the luminous reflectance of a test specimen. The $b$-scale spacing may also be varied by adjustment or selection of the value of the series resistance $Sb$. Closer scale spacings and therefore a longer $b$-scale range are obtained when the value of resistance $Sb$ is reduced.

Photoelectric measuring circuits in which the current output of a measuring photocell is balanced against a fraction of a constant current of a higher order, for example of an order of 100 times the magnitude of the measuring current, are of high sensitivity and consequently are subject to error from relatively small variations in the operating characteristics of the photocells, the electronic amplifiers and the transmission efficiencies of the several light paths. Continuous calibration or restandardization is therefore essential for accurate measurement of color factors and, in accordance with the invention, the colorimeter includes means continuously operative during intervals between measurements to maintain the standardization or initially established accuracy of the measuring apparatus. The restandardization network includes, in general, manually adjustable potentiometers which are substituted for the automatic potentiometers of the measuring network, and another pair of reversible motors which are switched across the output terminals of the respective amplifiers and which adjust the positions of certain of the photocells with respect to the light source in such manner as to establish voltage balances at the input terminals of the amplifiers when the potentiometer contacts are set at the known reflectance and chroma values of a standard specimen S.

The change-over between the measuring and the restandardizing condition of the colorimeter is effected by shifting the series of switches S1 to S5 from the end positions as shown in Figs. 1 and 2 to the alternative positions as shown in Fig. 3. The several switches are ganged for simultaneous operation, as indicated schematically by the broken line 21 connecting the blades of switches S1 and S2, and by the legend of Fig. 1, and are preferably elements of a telephone type relay including a solenoid 22. As shown schematically in Fig. 1, the armature 23 of the relay is biased towards dropout by a spring 24, and the several switches are therefore normally in the Fig. 3 positions to condition the colorimeter for restandardization. The solenoid 22 is energized through a lead 25 and a normally open switch 26 from a current source 27 which, for simplicity of the Fig. 1 diagram, is shown schematically as a battery 27 having a grounded terminal. In practice, this current source 27 is preferably the alternating current source which energizes the amplifiers, the motors and the light sources of the colorimeter. The closing of the switch 26 to condition the colorimeter for a measuring operation also completes the energizing circuit of a solenoid 28 to withdraw the standard specimen S from its normal position between the light source E and a test specimen TS; the specimen being returned to normal position by a spring 29 when the switch is opened.

As best seen in Fig. 3, when the switch 26 is open and the solenoids 22 and 28 are deenergized, the comparison photocell CP is connected by switch S1 across the resistance CR of a manually adjustable potentiometer having a tap 31 which is connected by lead 32 to the standardizing contact of the switch S2 and, through the resistance $Cb$ of a second manually adjustable potentiometer, to the conductor 11. The blade of switch S2 is connected to the positive lead 13 from the reflectance-measuring photocell PR and a fraction of the comparison photocell current is thus diverted from the lower section of the potentiometer resistance CR to oppose the current output of the reflectance-measuring photocell PR. The tap 33 of the potentiometer resistance $Cb$ is connected through switch S3 to the lead 15 from the photocell combination $Pb$, and the switches S4 and S5 of the amplifiers AR and $Ab$ complete circuits through leads 34, 35 respectively to windings F of reversible motors M1 and M2 which each have continuously energized windings F'. The comparison photocell CP is mounted on a hinged or flexible supporting plate 36 which is urged in one direction by a spring 37 and is moved in the opposite direction by motor M1 to adjust the comparison photocell CP into such position, with respect to the light source E, that a voltage balance is obtained at the input terminals of the amplifier AR when the tap 31 of the calibrating potentiometer CR is set at the known luminous reflectance value of the standard specimen S. Similarly, the "green" photocell P of the photocell combination $Pb$ is mounted upon a hinged or flexible plate 38 which is urged in one direction by a spring 39 and is positively moved in the opposite direction by the motor M2 to establish a voltage balance at the input terminals of the amplifier $Ab$ when the tap 33 is set on the chroma calibrating potentiometer $Cb$ at the known chroma of the standard specimen S.

The power switch for energizing the colorimeter should preferably be closed for a sufficient time to establish stable temperature conditions at the photocells and stable operating characteristics for the amplifiers, for example a quarter-hour or more, before measurements are made on test specimens. Closely accurate measurements of color values may of course be had without this delay since the colorimeter is continuously in standardizing condition until the switch 26 is closed for a color measurement, and the automatic potentiometers operate quickly to complete a measurement. It is preferable, however, to delay all measurements until at least relatively stable operating conditions are established.

The cotton colorimeter is of high sensitivity as the range of cotton color is limited and the full measuring ranges of the automatic potentiometers are available to cover only portions of the 0–100 ranges of $R_d$ $b$ values. The same high measuring sensitivity over the entire ranges of reflectance and chroma variation may be had with a colorimeter, as shown in Fig. 4, in which the measuring ranges of the potentiometers are limited but may be manually selected to cover any desired portion of their individual scale ranges. The Fig. 4 colorimeter differs from that shown in Fig. 1 by the inclusion of a photocell combination Pa and polarity-reversing switch for measurement of red-green values, a polarity-reversing switch associated with the photocell combination Pb for measurement of blue values, and the circuit elements for shifting the measuring ranges of the potentiometers. Except for the addition of the photocell combination Pa, the Fig. 4 network is basically the same as that of Fig. 1 and such elements as are or may be identical with those of Fig. 1 are identified by corresponding reference numerals but will not be described in detail.

The slidewire resistance Rd of the automatic potentiometer for measurement of the luminous reflectance of a test specimen is tapped across and manually slidable along a pair of identical resistances R', R" whose outer terminals are connected respectively to the measuring contact of switch S1 and to the conductor 11, the arrangement being such that the total series resistance is constant and indepedent of the adjustment of the slidewire along the resistance. The effective measuring range of the potentiometer may therefore be shifted over the full range of Rd values by an appropriate adjustment of the slidewire. Similarly, the slidewire b of the automatic potentiometer for measurement of yellow-blue values is tapped across and slidable along a pair of similar resistances b', b" whose outer terminals are connected respectively to the positive lead 13 from the photocell PR and the conductor 11. A polarity reversing switch 41 is provided between the photocell combination Pb and its leads 15, 15' as the polarity of the current output reverses over the yellow-blue range, and the current introduced into the slidewire b from the photocell combination Pb must be of opposite polarity to the comparison photocell current through the slidewire.

The apparatus and network for measurement of the tri-stimulus factor ±a=red-green is, in general, similar to the apparatus and network for measurement of ±b, and the ±a network is effectively connected in parallel with the ±b network. The photocell combination Pa includes a photocell P covered by a filter comprising a blue section B and a smaller amber section A, and a second photocell P covered by a green filter G and connected in current opposition to the first photocell P. A polarity reversing switch 42 is connected between the photocell combination Pa and its leads 43, 43' to the blade of a switch S6 and to the conductor 11, respectively. A resistance Sa is included in the lead 43, and an electronic amplifier Aa is bridged across the leads 43, and 43'. The slidewire a of an automatic potentiometer is tapped across and adjustable along a pair of identical resistances a', a" whose outer terminals are connected to lead 13 and the conductor 11 respectively. The sliding contact 44 of the potentiometer slidewire a is connected to the measuring contact of switch S6, and is adjustable by a motor Ma having a field winding F connected across the output terminals of the amplifier Aa by a switch S7 which is ganged to switches S1 to S6. The resistance Ca of a calibrating potentiometer is connected in parallel with the calibrating potentiometer resistance Cb by a lead 45, and the manually adjustable contact 46 of resistance Ca is connected by lead 47 to the standardizing contact of the switch S6. When the ganged switches S1 to S7 are adjusted for standardization, the output terminals of amplifier Aa are connected through switch S7 to a reversing motor M3 which adjusts the hinged support 48 of the "green" photocell P of the combination Pa, in opposition to a spring 49, to effect a voltage balance at the input terminals of the amplifier Aa.

The effective range of each automatic potentiometer depends upon the relative magnitudes of the potentiometer resistance and of the resistances across which it is tapped. The effective measuring range will be about 1/10 or 1/5 of the full scale range when the resistance of the potentiometer slidewire (Rd, a or b) is 2 or 40 ohms, respectively, and the associated series resistances (R', R", b' ... a") each has a value of 200 ohms.

Figure 5:
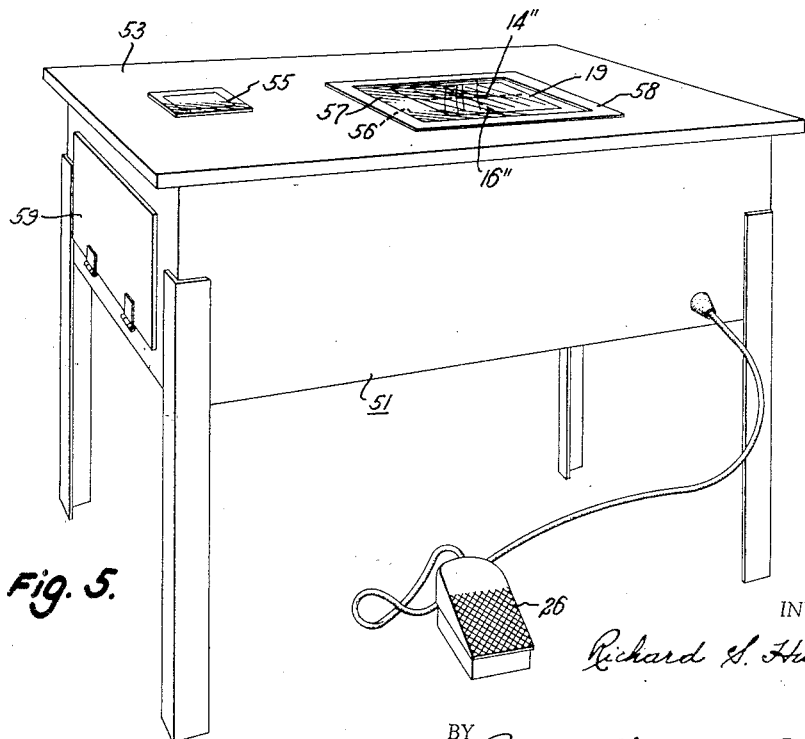
Fig. 5 is a perspective view of a cotton colorimeter which includes apparatus as shown schematically in Fig. 1.

A cotton colorimeter as shown schematically in Fig. 1 is preferably self-contained in a movable cabinet 51 with a removable top 53 at about table or desk height, the top having an opening adjacent the left side through which the cover glass 55 of the exposure heads extends to lie parallel to and slightly above the top surface, see Fig. 5. The top 53 is provided with a further opening across which a transparent or translucent plate 56 is secured flush with the cabinet top surface. The color diagram 19 is appropriately positioned on the plate 56 and retained thereon by a relatively heavy and transparent plastic sheet 57 which, in turn, is retained on the top 53 by a frame 58. The pointers 14' and 16' of the Rd and b potentiometers move in horizontal planes closely adjacent the lower face of the plate 56, and the shadows 14" and 16" of the pointers are thrown upon the plate 56 by a lamp, not shown, within the cabinet 51. The exposure head of the colorimeter is located at the left side of the cabinet 51, and a door 59 is hinged to the left side wall of the cabinet for access to the exposure head. The colorimeter is intended for use in cotton classing rooms where lint is always present, and gaskets are provided in conventional manner to seal the cabinet interior against the entrance of lint and dust. The switch 26 for energizing solenoid 22 for actuating the change-over switches and the solenoid 28 for withdrawing the standard specimen S from beneath the exposure area glass 55 is preferably a foot-pedal switch.

The exposure head which houses the optical and photoelectrical elements of the colorimeter is a sheet metal box of rectangular form with an open front facing the cabinet door 59. Light sources E, E' are located at opposite ends of the exposure head for directing light beams upon the exposure area of cover glass 55 at angles of 45°, and the several measuring photocells are positioned to receive light reflected from the specimens in a near-perpendicular direction.

The main housing member 61 is open at its top central section, and a partition wall is secured within this housing and comprises a lower U-shaped section 62, intermediate portions 63, 63' flaring outwardly therefrom at 45°, and terminal sections 64, 64' which extend somewhat above the top wall of the main housing member 61. The open top of the housing 61 is closed by a flanged cover plate 65 which fits over and is secured to the projecting ends 64, 64' of the partition wall and to the housing 61. The cover glass is secured over an opening in the plate 65 by a frame 66, and the standard specimen S is supported upon a shaft 67 journalled on the plate 65 and carrying a gear 68 in mesh with a toothed rack on a rod 69 secured to the core 28' of the solenoid 28. The toothed rod 69 is yieldingly urged away from the solenoid by spring 29 to hold the standard specimen S in position immediately beneath the glass cover plate 55. The solenoid 28 is supported by and housed within a box 71 secured to the rear face of the cover plate 65.

The light sources E, E' are sealed beam automobile spot lights mounted in plates 72, 72' secured by flexible extensions 73, 73' thereof to light shields 74, 74' at the opposite ends of the main housing member 61. The upper ends 75, 75' of the mounting plates are parallel to the end walls of the housing 61 and screws 76, 76' extend through the housing wall and the ends 75, 75' to adjust the light source positions in opposition to springs 77, 77' which surround the screws 76, 76' respectively. The axes of the light source E, E' are at 45° to the cover glass 55 of the exposure head, and the central portions c of the light beams from the sources E, E' are directed upwardly through openings in the partition wall portions 63, 63' to the lower surface of the standard specimen S or, when it is withdrawn, to the glass 55 of the exposure head. Edge portions d and e of the light beams are intercepted and reflected to a pair of parallel connected comparison photocells CP, CP' by mirrors 78, 79 and 78', 79', respectively. Filters 80 may be provided over the comparison photocells for protection against overheating by the incident light energy and/or to determine the effective ouput current of the comparison photocell combination. The mirrors 78, 78' are supported on brackets 81, 81' secured to the housing 61 and having extensions 82, 82', respectively, which extend along the light beams c, c and constitute light shields. The mirrors 79, 79' are supported on light shield members 83, 83' which are secured to the partition wall 62 and extend downwardly to overlap the light shields 74, 74' respectively.

The comparison photocells CP, CP' are supported upon a bent plate or bracket 36' which is secured to the back wall of the housing by a hinge 84. The plate 36' is urged downwardly by the spring 37, and its position is controlled by the reversible motor M1 which has a shaft with axially elongated gear teeth 85 in mesh with a pinion 86 on a shaft 87 threaded through a stationary nut or block 88. The motor and nut 88 are supported upon a bracket 89 which is secured to the rear face of the back wall of the housing 61, and the end of the shaft 87 projects through the back wall to bear against the hinged plate 36'.

An apertured wall 91 extends horizontally across the U-shaped section 62 of the partition wall to support the several measuring photocells. The P$b$ combination differs from that shown schematically in Figs. 1 to 3 in that there are two photocells P with blue filters B at the upper face of the wall 91, and a third photocell P with a green filter G on a plate 38 hinged to the lower face of wall 91 and urged downwardly by the spring 39. The motor M2 controls the position of the "green" photocell of the P$b$ combination through mechanism as above described with respect to the motor M1 and identified by corresponding but primed reference numerals. The photocell PR which is covered by a green filter G and develops a current proportional to the luminous reflectance of a specimen is also mounted on a plate 92 which is hinged to and below the wall 91, the plate being urged downwardly by a spring 93 and adjustable, as a factory adjustment, upwardly by a screw 94 which is threaded through a nut 95 welded or otherwise fixed to the wall of the housing 61.

Each end of the housing 61 is provided with ventilating openings 96 which are so positioned with respect to the light shields 74, 81—83 and 74', 81'—83' that stray light from the amplifier tubes and from the lamp which illuminates the color diagram 19 can not reach any of the photocells. The circuit connections of the light sources E, E' and the several photocells are not shown in Figs. 6 and 7 as they would tend to confuse the illustration of the physical structure of the exposure head and could add nothing to the clarity of the circuit diagrams of Figs. 1 to 3. Conventional cable connections, not shown, are preferably employed to connect the exposure head unit to other units of the complete colorimeter.

It is to be noted that while the connection of the slidewire $b$ of the chroma potentiometer between the sliding contact 14 of slidewire R$_d$, Figs. 1 and 2, provides uniform measurements of "$b$" values, on a uniform scale of graduations, from high to low values of reflectance R$_d$, the scale graduations of R$_d$ values are not uniform but are expanded towards its upper end. A uniform scale of R$_d$ values may be had by ganging a second potentiometer (corresponding to potentiometer R$v$, Fig. 2 of Patent No. 2,574,264) in parallel with the potentiometer R$_d$ to supply the slidewire $b$ with a current derived from the comparison photocell CP and varying in magnitude as a function of the reflectance of the specimen.

It is therefore to be understood that the invention is not limited to the particular photoelectric circuits and apparatus herein illustrated and described as various modifications which may occur to those familiar with the art fall within the spirit and scope of the invention as set forth in the following claims.

I claim:

1. In an automatic photoelectric colorimeter, means for supporting a test specimen, a comparison photocell, a light source for directly illuminating said comparison photocell and a specimen on said support, a plurality of photocell means provided with filters of different tristimulus characteristics positioned in the path of light from a specimen on said support, the filter of one photocell means conditioning the same to develop a current proportional to the luminous reflectance value of a specimen and the filter of a second photocell means conditioning the same to develop a current proportional to a chroma value, and means for measuring the luminous reflectance value and a chroma value of a test specimen on the support; said measuring means comprising a circuit network including an individual automatic potentiometer for measurement of the current output of each of said photocell means, each potentiometer including a slidewire and a reversible motor for adjusting a contact along the same, circuit elements connecting each photocell means between and end and the contact of the slidewire of its associated potentiometer, circuit elements connecting the slidewire for measurement of the luminous reflectance values between the terminals of said comparison photocell, circuit means for establishing through the other slidewire a current from said comparison photocell which varies in magnitude with the adjustment of the contact along said slidewire for measurement of luminous reflectance values, the polarity of the currents established by said photocell means in said slidewires being opposite to the polarity of the comparison photocell currents therethrough, and means including electronic amplifiers connected across the respective photocell means for energizing said potentiometer motors to displace said contacts to balance the currents from the respective photocell means by comparison photocell currents derived from the slidewires.

2. In an automatic photoelectric colorimeter, the invention as recited in claim 1, wherein said comparison photocell develops a constant current of an order substantially higher than the currents developed by said photocell means, and series resistances are connected between each photocell means and its associated potentiometer contact.

3. In an automatic photoelectric potentiometer, the invention as recited in claim 1, in combination with a color diagram, and pointers movable by the respective automatic potentiometers with respect to said color diagram, the color diagram bearing significant markings such that the intersection of said pointers identifies two tristimulus values of the specimen under test.

4. In an automatic photoelectric colorimeter, the invention as recited in claim 1, wherein a potentiometer slidewire is tapped across and manually adjustable along a pair of identical resistances, whereby the measuring range of that potentiometer is restricted to less than the full scale range of the tristimulus value which it measures and may be manually adjusted to a desired portion of said full scale range.

5. In an automatic photoelectric colorimeter, the invention as recited in claim 1, in combination with restandardizing means including means for projecting a standard specimen of known gray value and chroma into the path of light from said source to said specimen supporting means, switch means for deenergizing said automatic potentiometers, and motor means energized by said amplifiers for adjusting said comparison photocell and said second photocell means with respect to said light source to establish photocell currents proportional to the known gray value and chroma of the standard specimen.

6. In an automatic photoelectric colorimeter, the invention as recited in claim 1, in combination with means for restandardizing said colorimeter; said restandardizing means including a pair of manually adjustable potentiometers, a standard specimen of known equivalent gray value and chroma value, a pair of reversible motors for adjusting said comparison photocell and an element of the second photocell means with respect to said light source, ganged switch means operable between end positions to establish said measuring circuit network of automatic potentiometers or alternatively to substitute said manually adjustable potentiometers for said automatic potentiometers, said switch means including switches for connecting said second pair of motors to said amplifiers in place of the motors of said automatic potentiometers, solenoid means for actuating said ganged switch means to energize said manually adjustable potentiometers and to move said standard specimen into position to direct light beams from said light source to said photocell means, and a normally open switch for energizing said solenoid means, whereby said colorimeter is normally retained in restandardizing condition during intervals between closure of said normally open switch for measurement of the color values of a test specimen on said support.

7. In an automatic photoelectric colorimeter, the invention as recited in claim 1, in combination with a third photocell means for developing a current proportional to a second chroma value, and a third automatic potentiometer including a slidewire connected in parallel with the slidewire of said second potentiometer, and a motor for adjusting the contact of said third potentiometer to establish an algebraic balance between the current output of said third photocell means and the comparison photocell current through said slidewire of the third potentiometer.

References Cited in the file of this patent

UNITED STATES PATENTS

| Number | Name | Date |
|---|---|---|
| 2,165,054 | Johnson | July 4, 1939 |
| 2,221,160 | Worthington et al. | Nov. 12, 1940 |
| 2,267,319 | Benning | Dec. 23, 1941 |
| 2,273,356 | Holven et al. | Feb. 17, 1942 |
| 2,356,238 | Gillett et al. | Aug. 22, 1944 |
| 2,438,303 | Simmon | Mar. 23, 1948 |
| 2,461,623 | Armerding | Feb. 15, 1949 |
| 2,500,049 | Williams et al. | Mar. 7, 1950 |
| 2,542,564 | Park | Feb. 20, 1951 |